Dec. 5, 1967 P. E. HARRIS 3,356,375
UNITIZED OIL RINGS
Filed Dec. 4, 1964 2 Sheets-Sheet 1
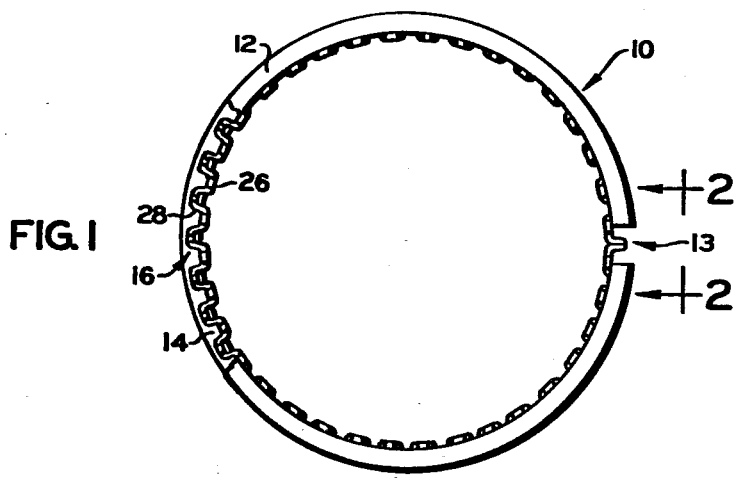
FIG. 1
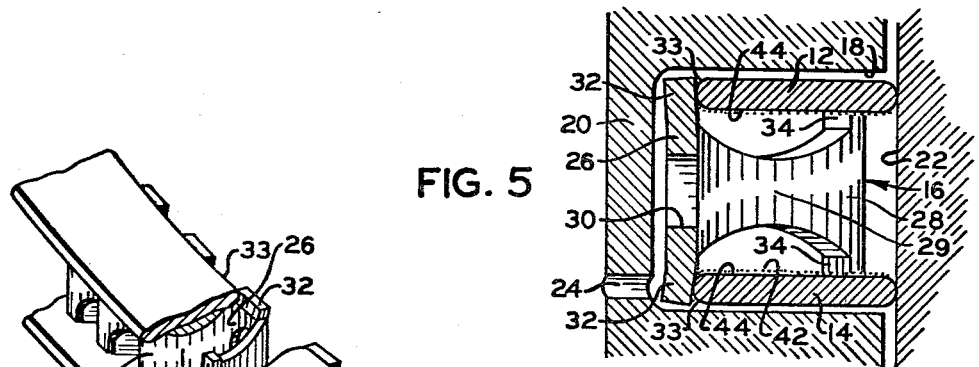
FIG. 5
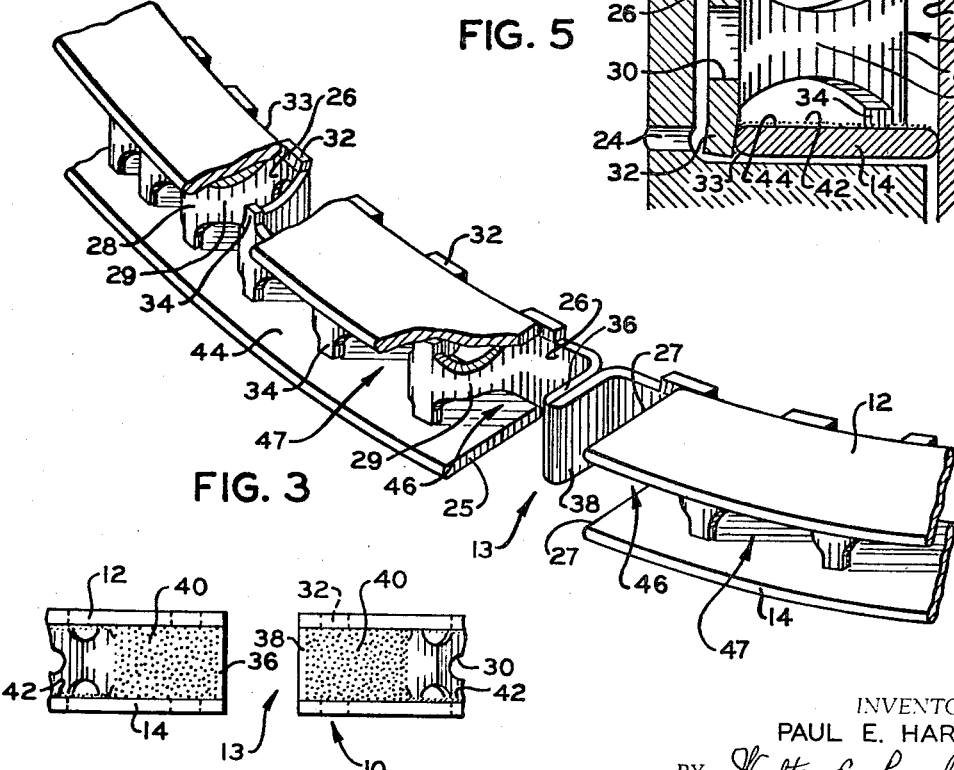
FIG. 3
FIG. 8
INVENTOR.
PAUL E. HARRIS
BY Walter C. Pavlick
Harold D. Shall
ATTORNEYS INVENTOR.
PAUL E. HARRIS
BY Walter E. Pavlick
Harold D. Shall
ATTORNEYS

United States Patent Office 3,356,375
Patented Dec. 5, 1967

3,356,375
UNITIZED OIL RINGS
Paul E. Harris, 400 S. Plum St.,
Hagerstown, Ind. 47346
Filed Dec. 4, 1964, Ser. No. 419,267
13 Claims. (Cl. 277—9.5)

ABSTRACT OF THE DISCLOSURE

A unitized oil ring is provided in which the spacer-expander is adhesively bonded to the side rails in a pre-compressed condition. The adhesive utilized is chosen so that it has sufficient shear strength at room temperatures to maintain a unitarily assembled oil ring but is also chosen so that it has the characteristic of breakdown under higher than room temperatures to permit normal operation of the oil ring when assembled in an internal combustion engine.

---

This invention relates to oil rings for use in conjunction with a piston and in particular to unitized multi-component oil rings.

Piston oil rings which are disposed in a groove in a piston and sealingly engage the wall of the cylinder receiving the piston are often of the multi-component assembled type. These components include a plurality of cylinder wall engaging rails and means for axially separating the rails and for applying a radially outward cylinder wall engaging bias to the rails; such means often being formed as a combined spacer-expander.

Obviously, the fewest number of separate components, such as for example a one-piece oil ring, would be more convenient in terms of storage, handling, and installation, if such can be constructed in a manner so as to retain the desired function and operation. In the case of multi-component oil rings wherein the components are not unitized, the various components must be handled separately in installation and all the components assembled in their proper relationship. A deleterious condition often occurring in assembling such separate components is that the ends of the combined spacer-expander will become overlapped and cannot function properly and also improperly position the rails. Further, during the handling of the various separate components, the same tend to become entwined and tangled which wastes time in separating the same and often damages the components. Many other conveniences are also realized.

The problem encountered in unitizing multi-component oil rings involves utilizing means capable of holding the components in their assembled relationship, which means will terminate the unitized relationship after the oil ring has been properly installed and thereafter not interfere with the functioning of the components. This requirement is particularly demanding in oil rings which utilize a combined circumferentially expansible spacer-expander, because in such an oil ring the rails tend to expand and contract radially while the spacer-expander tends to expand and contract circumferentially. Hence, when installing the oil rings on a piston, which involves increasing the diameter of the oil ring to position the same in the piston groove and then decreasing the oil ring's diameter as the piston is installed in the cylinder, the spacer-expander tends to move circumferentially relative to the rails which are expanding or contracting radially. This invention contemplates utilizing strong, resilient adhesive means capable of holding the ring components together during assembly yet still being capable of allowing disassociation of the ring components upon initial engine operation.

It is, therefore, an object of this invention to provide multi-component oil control rings wherein at least some of the components thereof are unitized.

It is another object of this invention to unitize multiple component oil control rings which include both radially and circumferentially compressible components.

It is still another object of this invention to unitize multi-component oil control rings with an adhesive which loses its adhesive properties under engine operating conditions.

It is still a further object of this invention to unitize multi-component oil control rings with an adhesive having strength which is high at room temperatures but which decreases with increasing temperature.

Another object of this invention is to provide means for preventing the ends of the spacer-expander member of a multi-component oil ring from becoming overlapped when assembled in a piston groove.

It has been found that various resins, when blended with proper elastomers, plasticizers and fillers, form adhesives which are capable of holding a multi-component oil ring together prior to, during, and after installation thereof on a piston. These adhesives must also change their characteristics under engine operating conditions so as to release the unitized components and may use a base resin selected, for example, from epoxy resins, phenol resins, or polyvinyl-butyral resins, or a combination of these. Resins from these groups have been utilized for the purpose of this invention, but it is apparent that other types of resins would serve the same purpose equally well. The important feature is that the properties for the specific use may be achieved through selection and variations in the base resins, elastomers, plasticizers, and/or fillers.

Referring now to the drawings:

FIG. 1 is a plan view of a unitized oil control ring assembly in the free state with a portion of the top rail cut away;

FIG. 2 discloses a portion of the assembly shown in FIG. 1 when viewed in the direction of the arrows 2—2 shown in FIG. 1;

FIG. 3 is a perspective view of a section of an oil control ring showing the gap in the rails and with portions of the top rail cut away and the adhesive omitted for added clarity;

FIG. 5 is a cross-sectional view of an oil control ring assembly positioned in a piston groove and engaging a cylinder wall;

FIG. 8 is a view taken in the same manner as FIG. 2 of an oil control ring which has been unitized with the ends of the spacer-expander in registration with the ends of the rails.

Figure 2:
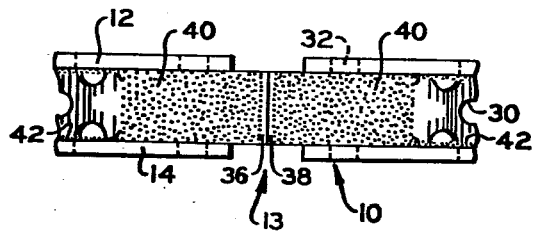

Referring now to the drawings, a piston oil ring assembly 10 comprises a pair of annular rails 12 and 14 and a combined or unitary circumferentially expansible and compressible spacer-expander 16 and is adapted to be installed within a peripheral annular groove 18 formed in a piston 20 and confined within a cylinder 22 of an internal combustion engine. The spacer-expander 16 is disposed axially intermediate the rails 12 and 14 and is axially spaced from the piston 20 thereby. A passage 24 is formed in the piston 20 leading from the bottom of the groove 18 to the interior of the piston for draining oil from the groove.

Each of the rails 12 and 14 is preferably made from a flat strip of metal, such as spring steel, and is provided with a radially extending gap 13 to permit it to expand and contract in a radial direction while the circumferential length thereof remains substantially constant. It should be noted that in the assembled condition of the piston ring assembly 10, when the same is disposed in the groove 18 of the piston 20 and confined within the cylinder 22, the ends 25 and 27 of each of the rails 12 and 14, which border the gap 13 therein, still remain circumferentially spaced from each other so as to permit the radial movement of the rail. Accordingly, each rail is resilient and, by itself, exerts some outward pressure against the wall of the cylinder 22. Further, it should be noted that in order to assemble the rails 12 and 14 within the groove 18 it is necessary to radially expand the same. Additionally, when the piston 20 is confined within the cylinder 22, the latter will radially compress the rails 12 and 14.

The spacer-expander 16 comprises a plurality of circumferentially spaced support members 26 connected by U-shaped spring members 28. The radially inner ends of the arms 29 of each spring member 28 are integrally connected to adjacent support members 26 and extend radially outwardly therefrom. An opening 30 is formed at substantially the center of each support member 26 for oil drainage purposes, and the arms 29 of the spring member are axially reduced in thickness to provide passageways between the same and the rails 12 and 14 for oil drainage purposes. A tab 32 is formed on each of the lower and upper sides of each support member 26 and extends axially outwardly and radially inwardly therefrom to a position wherein the same engage the radially inner edge 33 of each of the rails 12 and 14. Each U-shaped spring member 28 is formed with a pair of axially and oppositely extending engaging portions 34 formed at its radially outer extremities which portions 34 axially engage the inner surface 44 of the rails 12 and 14 adjacent the outer periphery thereof and hold the same in an axially spaced relationship.

While the spacer-expander 16 is of substantially annular configuration, the same is of greater circumferential length than the rails 12 and 14 and is formed with a pair of juxtaposed circumferential ends in the form of radially extending plates 36 and 38 which plates preferably have an axial dimension which is equal to the desired axial space between the rails 12 and 14 and are adapted to be in abutting engagement when the spacer-expander is operatively confined within the cylinder 22 while the ends 25 and 27 of the rails 12 and 14 remain spaced.

The spacer-expander 16 is made from resilient sheet metal, and is circumferentially compressible and expansible, and, when the same is operatively confined within the cylinder 22 with the plates 36 and 38 in engagement, it is circumferentially compressed and tends to expand and thereby increase its circumferential dimension. Such increase in circumferential dimension is accompanied by an increase in diameter and causes the spacer-expander 16 to exert a radially outward pressure against the inner peripheries 33 of the rails 12 and 14, thereby forcing the latter against the cylinder wall 22 with an urging force which adds to the urging force supplied by the resilient qualities of the rails 12 and 14 themselves.

In the preferred embodiment of this invention two different adhesives are used to unitize the components of the oil ring 10 prior to the assembly of the latter in the groove 18 of the piston 20. A first, or primary, adhesive 40 secures the spacer-expander 16 in the vicinity of the ends 25 and 27 of the rails 12 and 14 so that the ends 36 and 38 of the spacer-expander are juxtaposed. It should be noted that to place the spacer-expander 16 within the rails 12 and 14 with its ends 36 and 38 juxtaposed, the spacer-expander must be circumferentially compressed and its circumferential length decreased. Since the spacer-expander 16 is circumferentially compressed, the same is attempting to circumferentially expand and, in so doing, the tabs 32, which are in engagement with the inner periphery 33 of the rails 12 and 14, tend to urge the rails axially apart and radially outwardly. Since the rails 12 and 14 at this time are not contained within the piston groove 18, where they would be restrained from moving axially apart, the rails would separate axially and allow the spacer-expander to pop out therebetween and circumferentially expand.

To prevent such axial separation of the rails 12 and 14, a second or secondary adhesive 42 secures the inner periphery 33 and the inner surface 44 of the rails to the tabs 32 and projections 34, respectively, of the spacer-expander, thereby preventing the rails from separating axially and the spacer-expander from popping out beyond the rails.

Both the primary adhesive 40 and the secondary adhesive 42 are structural adhesives which are characterized as having an adhesive strength which is sufficiently high and stable at room temperature to unitize the components but decreases rapidly with elevated temperatures.

Figure 4:
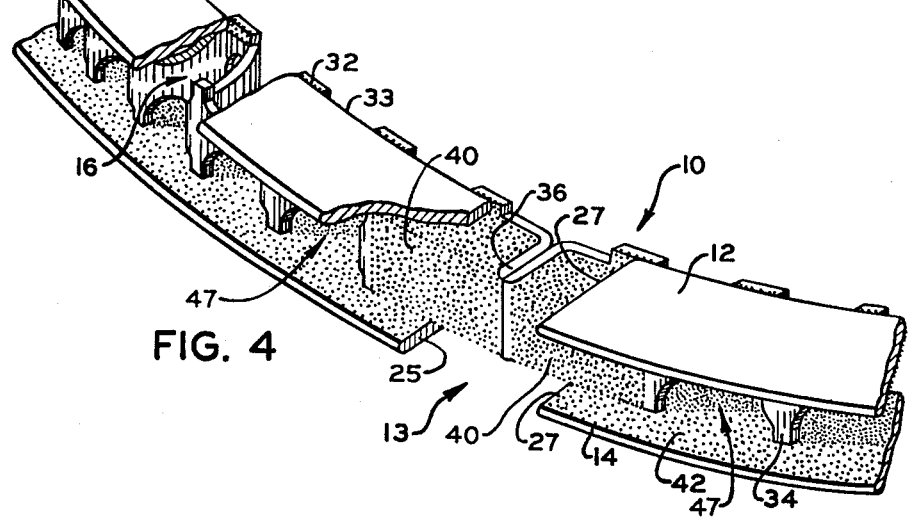
FIG. 4 is a view of the structure shown in FIG. 3 after the oil control ring has been unitized with adhesive.

As shown in FIG. 3, a void 46 is provided by the components of the ring assembly 10, which void is partially bounded by the opposed surfaces 44 of the rails adjoining the ends 25 and 27 thereof and the plates 36 or 38, the adjacent arm 29 and the support member 26 connecting the plate and arms of the spacer-expander 16. As shown in FIG. 4, the void 46 is filled with primary adhesive 40, thereby adhesively bonding the portions of the spacer-expander and the rails surrounding the voids 46. Preferably the adhesive 40 is relatively thick so that it will remain in the void and not run or disperse itself to undesired locations. It is preferred that the ends 25 and 27 of the rails 12 and 14 be axially aligned as shown in FIGS. 1–4, although, as shown in FIG. 6 and hereinafter described, one rail 12A may be rotated circumferentially relative to the other rail 14 thereby providing an offset gap between the ends of the rails.

Since the bonding with the secondary adhesive 42 is only by the tabs 32 and the projections 34 to the rails 12 and 14, adhesive need only be applied at these locations; however, the secondary adhesive 42, for convenience, is preferably applied as a thin coating to the entire inner periphery 33 and inner surface 44 of the rails 12 and 14 prior to the assembly of the components of the ring 10 so that the portions 32 and 34 of the spacer-expander 16 are bonded to the rails. The thin layer of adhesive 42 on the rails 12 and 14 at the locations removed from the portions 32 and 34 do not interfere with normal operation of the assembly.

In an alternative means for bonding the ring assembly, the primary adhesive 40 may be applied in the voids indicated at 47 which voids are intermediate the first and second successive engaging portions 34 following plates 36 and 38 and are bounded by the opposed surfaces 44 of the rails 12 and 14, a pair of adjacent arms 29 and a supporting member 26 of the spacer-expander 16. The secondary adhesive is applied to the inner peripheries 33 and surfaces 44 as described previously. The advantage of this alternative method is that more surface area of the rails 12 and 14 and of the spacer-expander 16 is exposed for contact with the adhesive 40, thereby resulting in a stronger bond between the rails and spacer-expander for compression of the latter while still securing the ends 36 and 38 of the spacer-expander to the ends 25 and 27 of the rails.

Figure 6:
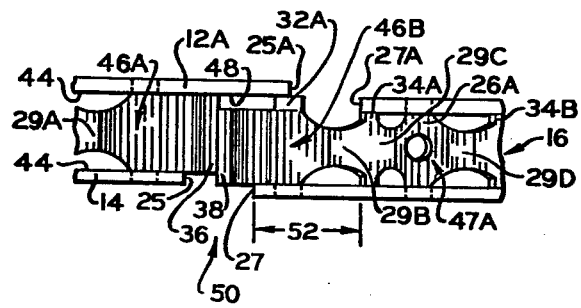
FIG. 6 is a view taken in the same manner as FIG. 2 of an oil ring having an offset gap and shown with its ends in an axially displaced relationship and with the adhesive omitted for added clarity.

The unitized oil ring in FIG. 6 is shown with its ends in an axially displaced relationship so that the construction of this assembly may be clearly demonstrated. In this embodiment, during assembly of the ring components, one of the rails, for example the top rail 12A, is circumferentially rotated relative to both the bottom rail 14 and the spacer-expander 16 so that its end 27A is disposed adjacent the engaging portion 34A and its end 25A extends to the tab 32A. That is, the top rail 12A is rotated approximately the distance indicated at 52.

The primary adhesive 40A is applied within a void indicated at 46A, which void is partially bounded by the rails 12A and 14, the plate 36 and the arms 29A to adhesively bond the spacer-expander 16 to the end 25 of the rail 14 and to the inner surface 44 of the rail 12A bounding the void 46A. Primary adhesive 40B is applied within the void indicated at 47A, which void is bounded by the rails 12A and 14, the portions 34A and 34B, the support 26A, and the arms 29C and 29D, to bond the spacer-expander 16 to the end 27A of the top rail 12A and to the adjoining inner surface 44 of the rail 14. The void 46B adjacent the plate 38 should not be filled with primary adhesive 40B since the inner end 25A of the rail 12A should not be bonded to the spacer-expander 16 at this location, otherwise the adhesive would interfere with the circumferential movement of the top rail 12A.

The secondary adhesive is applied to the entire inner periphery 33 and inner surface 44 of the rails 12A and 14 except for that portion of the inner surface of the top rail 12A indicated at 48 which extends beyond the plate 36 and overlies the plate 38 of the spacer-expander 16. With this method of assembly, a unitized oil ring is provided having an off-set gap 50 which is still capable of expansion for installation on a piston and subsequent compression for assembly into the cylinder 22. Since the plates 36 and 38 of the spacer-expander 16 are secured to the rails 12 and 14 there is no opportunity for the same to become overlapped during the assembly operation so that the spacer-expander is maintained in a spaced relationship relative to the piston 20 with its plates 36 and 38 juxtaposed.

An extension of this alternative method of assembly to obtain an off-set gap would be to rotate the top rail 12A relative to the spacer-expander 16 the distance 52, as shown in FIG. 6, and also to counterrotate the bottom rail 14 this same distance and utilizing suitable cementing procedures to obtain the expansion capability of the unitized ring.

Still another method of assembly, as shown in FIG. 8, is by placing the gap 13 of the ends 25 and 27 of the rails 12 and 14 in axial alignment with one another and bonding the spacer-expander 16 to the rails in a manner that the ends 36 and 38 of the spacer-expander are in registration with the ends 25 and 27 of the rails respectively.

The preferred composition of the primary adhesive 40 is as follows:

| Ingredients: | Weight percent |
|---|---|
| Epon 828 | 69.0 |
| Thiokol LP-3 | 17.3 |
| DMP-30 | 7.2 |
| Cab-O-Sil, Type M-5 | 6.5 |
| (Total solids 100%) | 100.0 |

Epon 828, a product of Shell Chemical Company, is a liquid bisphenol A/epichlorohydrin type epoxy resin having an epoxide equivalent weight of 185-200.

Thiokol LP-3 is a low molecular weight liquid polysolfide polymer composed of repeating formal groups which are linked by sulfur to sulfur bonds and terminated by mercaptan groups. Additional mercaptan groups occur at intervals on the chain of repeating formal groups which provide cross linkages at various points. This polymer is a product of Thiokol Chemical Corporation.

When in the presence of a suitable activator or curing agent, epoxy resins co-react by an additional reaction with the Thiokol LP-3 polysulfide polymer, thereby forming longer chain polymers. Aliphatic or aromatic amines are the most common activators and approximately ten parts of amine activator, or curing agent, per one hundred parts epoxy resin is required. The relative amount of the polysulfide polymer blended with the epoxy resins governs the ultimate properties of the cured adhesives, such as shear strength and temperature stability.

The aromatic amine activator, or curing agent, used in the polysulfide epoxy adhesive formulation is DMP-30, a product of Rohm and Haas Chemical Company. Its chemical name is tridimethylamino methyl phenol.

The Cab-O-Sil, Type M-5, is a product of Godfrey L. Cabot, Inc. and is defined as an ultrafine pyrogenic silica, sometimes referred to as colloidal silica because of its fine particle size range of 0.015-0.020 micron. The Cab-O-Sil is employed in the liquid adhesive formulation as a thickening or bodying agent, and to provide adequate thixotropy. The thixotropic properties imparted to the adhesive by the addition of fine silica aids in preventing any running or sagging of the adhesive during the heat-cure cycle.

The Epon 828, Thiokol LP-3 and Cab-O-Sil Type M-5 were accurately weighed into a suitable container and mixed by hand to wet-out the Cab-O-Sil. This mixture was then given three passes over a 3-roll laboratory size paint mill to insure uniform dispersion of the Cab-O-Sil. Following the milling step, the appropriate amount of DMP-30 (curing agent) was stirred into the base adhesive. At this point the adhesive was ready for use and had an effective pot-life of about 20 minutes.

This primary adhesive 40 may be cured by heating the same in air up to a temperature of 300° F. for thirty minutes. After curing and cooling, the adhesive 40 is stable, that is, it has sufficient strength to maintain the spacer-expander 16 bonded in its compressed state to the rails 12 and 14, up to a temperature of 140° F. and will lose sufficient of its adhesive properties substantially immediately when exposed to motor oil at approximately 180° F., the operating temperature of the convention internal combustion engine, so that the forces imposed on the adhesive 40 by the compressed spacer-expander 16 will easily disrupt the bond afforded thereby and the spacer-expander is released from the rails 12 and 14 to expand and contract circumferentially.

The primary adhesive 40 may be used to spot bond the entire circumference of the ring assembly, but it is preferable to use this adhesive at the ends of the rails only and to use the secondary adhesive 42 for bonding other portions of the spacer-expander to the rails to overcome pop-out, which adhesive is preferably in a fluid solution state so that it may be spread as a relatively thin coating. Pop-out of the spacer-expander would occur due to the fact that there is nothing to maintain the axial distance between the rails prior to installing the ring 10 in the piston groove 18 and the tabs 32 attempt to urge the rails axially apart. When installed, the ring assembly is placed in a groove 18 of the piston 20 which groove, together with the spacer-expander 16 keeps the rails 12 and 14 in position. Obviously, prior to installation within the groove 18, the spacer-expander 16 would have a tendency to slip radially outwardly and past the two rails 12 and 14 in a pop-out position thereby relieving the desired circumferential compression therein and in such pop-out position, the assembly cannot be placed in the groove 18.

The preferred secondary adhesive is based on a polyvinyl butyral-phenolic resin blend. The adhesive found to provide satisfactory results in this application has the following composition:

| Ingredients: | Weight percent |
|---|---|
| Burvar B-76 | 14.0 |
| Durez 12687 | 7.0 |
| Toluene | 55.0 |
| Alcohol #30 | 24.0 |
| (Total solids 21%) | 100.0 |

Burvar B-76 is a polyvinyl butyral resin produced by Shawinigan Resins Corporation and may be characterized as being 88% butyral, 0-2.5% acetate, and 9.0-13% hydroxyl. Durez 12687 is a thermosetting phenolic resin which may be obtained from Durez Plastics Division of Hooker Electrochemical Company.

Combinations of polyvinyl butyral resin with phenolic resins are commonly used in the manufacture of structural adhesives. The polyvinyl butyral-phenolic adhesive gives very high shear strength values at room temperatures, but its shear strength decreases rapidly with increasing temperatures.

The secondary adhesive is a fluid solution and may be applied in the desired thin coating by brush to various points around the ring assembly. Following evaporation of the solvent at room temperature, the pieces are assembled and the adhesive is activated and heat cured. After curing and cooling the secondary adhesive 42 is also stable, that is, it has sufficient strength to maintain the spacer-expander 16 bonded in its compressed state to the rails 12 and 14, up to a temperature of 140° F., and will lose sufficient of its adhesive properties substantially immediately when exposed to motor oil at approximately 180° F., the operating temperature of the conventional internal combustion engine, so that the forces imposed thereon by the compressed spacer-expander 16 will easily disrupt the bond afforded thereby, and the spacer-expander is released from the rails 12 and 14 and may move circumferentially relative to the rails. Actually, the secondary adhesive 42 is not necessary after the ring 10 has been assembled in the piston groove 18, since the groove will then prevent axial separation of the rails 12 and 14.

Figure 7:
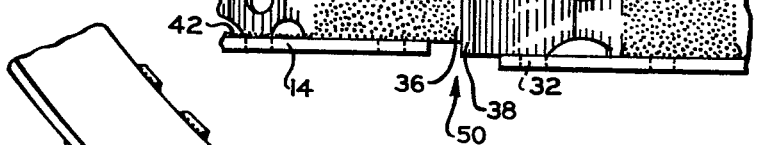
FIG. 7 is a view of the structure shown in FIG. 6 with the components unitized with adhesive.

This secondary adhesive 42 is prepared by mixing appropriate amounts of toluene and alcohol and dissolving the resins therein by mechanical stirring. This adhesive solution is then brushed onto the cleaned opposed surfaces 44 of the rails and the projectors 34 of the spacer-expander; the primary adhesive 40 is applied to the ends of the rails 12 and 14 and in the voids 46 of the spacer-expander 16 and the ring assembly is placed in a holder which keeps the components of the assembly compressed in the relationship shown in FIGS. 4 or 7. The ring 10 is then kept at room conditions until the solvents of the secondary adhesive 38 evaporate. The ring assembly in the holder is then heated at 300° F. for 30 minutes to complete the curing of the adhesives.

In comparing the two adhesives used in this invention, the primary adhesive has higher viscosity than the secondary adhesive and for this reason is applied in sufficient quantity to the ends of the rails to hold the components in place. This primary adhesive is applied heavily and completely fills the voids 46, 47 or 47A. Because the primary adhesive is considerably more viscous than the secondary adhesive, it cannot conveniently be applied in small quantities within the inner surfaces 44 of the rails 12 and 14. Since it is desirable to limit the amount of adhesive placed on the inner surfaces 44 so that the openings between the arms 29 of the spacer-expander 16 and the rails 12 and 14 are not filled, thereby preventing oil ventilation, the primary adhesive is not as suitable in this location as the secondary adhesive 42 which, due to its lower viscosity, can be applied in a thin film to the inner surfaces 44 of the rails 12 and 14. The secondary adhesive 42 has sufficient viscosity to adhere to the inner peripheries 33 and surfaces 44 when applied thereto in sufficient quantity and to prevent pop-out of the spacer-expander.

The secondary adhesive 42 while being stable up to a temperature of 140° F. loses its shear strength more rapidly with increasing temperature and releases the ring components sooner than the primary adhesive 40 so that it will also lose its adhesive properties upon initial exposure to conventional internal combustion engine operating conditions.

The secondary adhesive 42 alone may be used to unitize the ring assembly 10; however, because of the low viscosity of this adhesive, it is preferable to place a filling material either in voids 46 or voids 47 which would serve as a base for the adhesive. Such a filler may be made from plastic, wood, metal or the like. This filler would be a permanent part of the ring assembly, but would not interfere with the operation of the other components.

Although the preferred embodiment of this invention has been shown and described, changes and modifications can be made. The preceding description is illustrative only and not for the purpose of rendering this invention limited to the details illustrated or described except insofar as they have been limited by the terms of the following claims.

What is claimed is:

1. A multi-component oil ring assembly adapted for insertion in a piston groove comprising in combination a pair of circumferentially extending axially spaced rail means, a circumferentially extending and circumferentially resiliently precompressed spacer-expander means engaging and urging said rail means radially outwardly and having at least a portion thereof disposed intermediate to and axially spacing said rail means, and a resinous adhesive means acting in shear to bond said precompressed spacer-expander means to said rail means, said adhesive means having a shear strength which is sufficiently high to bond said spacer-expander means to said rail means at room temperatures and maintain the compression thereof and which shear strength at approximately 180° F. is insufficient to maintain the compression of said spacer-expander means whereby said adhesive means releases said spacer-expander means from said rail means when exposed to internal combustion engine operating conditions.

2. An oil ring as described in claim 1 wherein at least a portion of said resinous adhesive means comprises 60–80% epoxy resin, 10–25% polysulfide polymer, 5–10% thixotropic agent, and 5–10% curing agent.

3. An oil ring as described in claim 2 wherein said epoxy resin is bisphenol A/epichlorohydrin, said liquid polysulfide polymer has a low molecular weight, said trixotropic agent is pyrogenic silica and said curing agent is an aromatic amine activator.

4. An oil ring as described in claim 1 wherein at least a portion of said resinous adhesive comprises 10–20% polyvinyl butyral resin, 5–10% phenolic resin, 50–60% aromatic amine activator and 10–30% alcohol.

5. An oil ring as described in claim 4 wherein said phenolic resin is thermosetting, and said aromatic amine activator is toluene.

6. A multiple component oil ring comprising a pair of coaxial, circumferentially extending and axially spaced rails having opposed inner surfaces and each having a radially extending gap, a unitary circumferentially extending spacer-expander having a first portion thereof disposed axially intermediate and coaxial with said rails for spacing the same and a second portion thereof engaging said rails for urging the same radially outward and circumferentially opposed end portions adapted to circumferentially engage each other, and adhesive means bonding said end portions of said spacer-expander to at least one of said rails in axial alignment with the gap therein for maintaining said end portions in a circumferentially spaced relationship and bonding said first portions of said spacer-expander to the inner surface of at least said one rail for maintaining said spacer-expander coaxial with said rails.

7. A multi-component oil ring for mounting in a groove of a piston comprising a pair of coaxial, axially spaced rails having opposed inner surfaces and each having a pair of circumferentially opposed end portions defining a radially extending gap therebetween, a unitary spacer-expander having a first portion thereof disposed axially intermediate said rails for spacing the same and a second portion thereof engaging said rails for urging the same radially outwardly and circumferentially opposed and adjacent end portions adapted to circumferentially engage each other, a first resinous adhesive bonding said end portions of said spacer-expander to said rails on opposed circumferential sides of the gap therein and a second resinous adhesive applied to the inner surfaces of said rails and securing the same to said first portions of said spacer expander to contain said spacer-expander intermediate said rails.

8. An oil ring as described in claim 7 wherein said spacer-expander is of greater circumferential length than said rails and has juxtaposed ends in axial alignment with said radially extending gaps of said rails.

9. An oil ring as described in claim 7 wherein each of the opposed end portions of one of said rails is in axial alignment with one of said opposed end portions respectively of the other of said rails, one of said end portions of said spacer-expander is in axial alignment with each of the aligned ends respectively of said rails, and said first adhesive bonds said aligned end portions to each other.

10. A multi-component oil ring assembly for insertion in a piston ring groove comprising a pair of circumferentially extending, axially spaced cylinder engaging rails, each of said rails having an inner surface and a radial width greater than its axial thickness and having a pair of circumferentially opposed and spaced end portions forming a radially extending gap therebetween, a circumferentially extending spacer-expander for axially spacing and radially outwardly urging said rails and comprising a plurality of adjacent circumferentially spaced and circumferentially compressible and expansible resilient members disposed intermediate said rails, connecting members interconnecting the adjacent of said resilient members, tab means formed on at least some of said members and engaging the radially inner edges of said rails whereby said spacer-expander is operative to urge said rails radially outwardly, axially opposed engaging means formed on at least some of the members of said spacer-expander and engaging the axially inner surface of and axially spacing said rails, said spacer-expander having a pair of circumferentially opposed end portions in axial alignment with said gap between the opposed end portions of one of said rails, a first adhesive being adhesively stable at room temperatures and being operative to lose its adhesive properties under internal combustion engine operating conditions and being applied axially intermediate said rails and bonding the aligned end portions of said spacer-expander to at least said one rail, and a second adhesive means being adhesively stable at room temperature and operative to lose its adhesive properties under internal combustion engine operating conditions and being applied to the inner surface of said one rail and bonding the same to at least some of said engaging means engaging the same whereby said first and second adhesive means unitize said one rail and said spacer-expander.

11. The oil ring of claim 10 wherein said spacer-expander has a circumferential length substantially greater than the circumferential length of said one rail, said spacer-expander is circumferentially compressed so that its circumferential length is only slightly greater than said one rail and its end portions are in axial alignment with said gap between the opposed end portions of said one rail, and said first adhesive bonds said spacer-expander at said opposed end portions to each of the ends of said one rail and retains said spacer-expander in its circumferentially compressed condition.

12. A multi-component oil ring assembly adapted for insertion in a piston ring groove comprising in combination a pair of axially spaced, circumferentially extending rail means, circumferentially extending and circumferentially compressible and expansible spacer-expander means having a greater free circumferential length than said rail means, said spacer-expander means being circumferentially precompressed to a circumferential length slightly greater than said rail means and being disposed coaxially with and axially intermediate said rail means for axially spacing and radially outwardly urging the latter, and means acting in shear for releasably unitizing said circumferentially compressed spacer-expander means to said rail means, said means for releasably unitizing said circumferentially compressed spacer-expander means comprising a resinous adhesive means having stable bonding properties at room temperatures and being operative to lose its bonding properties when exposed to external combustion engine conditions, said adhesive means bonding said spacer-expander means to said rail means.

13. A multi-component oil ring adapted for insertion in a piston ring groove comprising in combination a pair of coaxial circumferentially extending and axially spaced rails each having a pair of circumferentially opposed and spaced end portions defining a radially extending gap therebetween, a unitary spacer-expander having a first portion thereof disposed axially intermediate said rails for spacing the same and a second portion thereof engaging said rails for urging the same radially outwardly and circumferentially opposed and adjacent end portions adapted to circumferentially engage each other, said spacer-expander being circumferentially longer than said rails when the end portions thereof are in engagement and being circumferentially precompressed to a circumferential length greater than the circumferential length of one of said rails but less than the sum of the circumferential length of one of said rails and the circumferential distance between the opposed end portions thereof and with the end portions of the spacer-expander circumferentially spaced, and adhesive means bonding said circumferentially compressed spacer-expander to said rails, each of said opposed end portions of one of said rails is in axial alignment with one of said opposed end portions respectively of the other of said rails, said end portions of said spacer-expander are in axial alignment with the gaps of said rails and said adhesive means comprises a first and second resinous adhesive means, said first adhesive means bonding said end portions of said rails to said spacer-expander and said second adhesive means bonding said first portion of said spacer-expander to said rails.

References Cited
UNITED STATES PATENTS

| | | | |
|---|---|---|---|
| 2,140,710 | 12/1938 | Meisel | 277—1 X |
| 2,293,450 | 8/1942 | Wilkening | 267—1.5 |
| 2,781,899 | 2/1957 | Schmank | 206—46 |
| 2,854,301 | 9/1958 | Lutz | 267—1.5 |
| 3,004,811 | 10/1961 | Mayfield | 277—141 X |
| 3,099,560 | 7/1963 | Kouri | 96—78 |
| 3,140,096 | 7/1964 | Rodenkirchen | 277—141 |

LAVERNE D. GEIGER, *Primary Examiner.*

J. S. MEDNICK, *Assistant Examiner.*